United States Patent Office 2,821,523
Patented Jan. 28, 1958

---

2,821,523

ESTER OF USING OIL ACID, ROSIN, AND METHYL ALPHA-D-GLUCOSIDE AND PROCESS OF MAKING IT

Burton E. Lederman, Dayton, Ohio, assignor to Midland Chemical Corporation, Dayton, Ohio, a corporation of Delaware No Drawing. Application January 19, 1954
Serial No. 405,039

2 Claims. (Cl. 260—104)

This invention relates to wrinkle drying compositions and more particularly to wrinkle drying coating compositions containing fatty acid esters of methyl alpha D-glucoside.

Methyl alpha D-glucoside which may be prepared as a white crystalline powder is generally represented by the structural formula

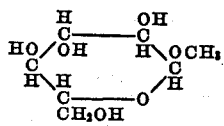

The compound has four esterifiable and reactive hydroxyl groups, as will be seen, which makes it suitable for reaction with wrinkle drying oils and their fatty acids. When two or more of the hydroxyls are esterified with conjugated double-bond (wrinkling) oils and fatty acids thereof, the resultant ester provides an oil having improved drying characteristics and one which is especially suitable for the preparation of wrinkle finishes.

The present invention provides new wrinkling oils adapted for the preparation of quick drying wrinkle coating compositions and vehicles. The fatty acid glucoside ester is prepared by the direct esterification of the drying oil fatty acids with the glucoside. The resultant oils are characterized by relatively high viscosity, rapid bodying rate, and fast drying when sprayed or applied to a coating surface in the form of a thin film. Upon air drying and baking for a few minutes at temperatures of from 150° F. to 250° F. a hard wrinkle coating film is produced having good adhesion and the hard, tough film produced is resistant to attack by water, alkali, and acid solutions. The improved drying and durable properties of the ester oil are reflected in varnishes and enamels prepared therewith, such as prepared with phenolic aldehyde resins or ester gum, and with or without the addition of drying oil catalysts such as metal naphthenates.

It is thus a principal object of this invention to provide new wrinkling oils adapted for the quick drying of wrinkle coating compositions and vehicles, the fatty acid glucoside ester being especially adapted for use in the preparation of varnishes and pigmented compositions such as enamels, and which wrinkle upon drying and baking to a tough, hard film.

It is another object to provide a wrinkling oil of the character described, having improved drying properties and which is useful in the preparation of air drying wrinkling finishes.

These and other objects and advantages of the invention will become apparent from the following description.

The invention may be better understood by referring to the following examples which serve to show how the invention may be practiced. It is not intended, however, that the invention be limited to the specific details and proportions of constituents as set forth in the examples.

Example I

To one mol of methyl-alpha-D-glucoside (crystalline powder) is added four mols of tung oil fatty acids and the mixture is heated in a closed stainless steel kettle (equipped with an agitator) to a temperature of 375–390° F. until approximately one-half of the esterification is completed. Thereafter the temperature is raised gradually over a period of approximately an hour to 450° F. and maintained until the esterification is completed.

Example II

Two mols of methyl-alpha-D-glucoside and two mols of tung oil fatty acids are mixed and heated to 375° F.–390° F. for three to four hours or until about one-half of the esterification is completed. The temperature is then raised gradually over a period of an hour to 445° F. and maintained until the diester reaction is completed.

Example III

In this example the reaction was carried out as in Example I, except oiticica oil fatty acids in the same mol proportion as tung oil fatty acids is substituted to produce the ester.

Example IV

In this example the esterification is carried out as in Example I, except dehydrated castor oil fatty acids (isoline fatty acids) in like amount as tung oil acids is substituted for tung oil acids to produce the ester.

Example V

Tung oil fatty acid esters of methyl glucoside is produced as in Example I with the modification that when the temperature reaches 450° F. carbon dioxide gas is bubbled through the batch while the batch is maintained at this temperature for completion of the esterification. The resultant fatty acid ester drying oil has a lower acid number than that of Example I and increased body or viscosity which is desirable in some instances.

Example VI

One mol of methyl-alpha-D-glucoside, one mol of linseed oil fatty acids and three mols of tung oil fatty acids are reacted together in a suitable container by heating the mixture to 500° F. and holding the heat until the reaction is complete. The resultant drying oil product forms a suitable vehicle for wrinkle drying compositions.

Example VII

One mol of methyl-alpha-D-glucoside, one mol of rosin (abietic acid) and four mols of tung oil fatty acids are reacted together in a suitable container by heating the mixture to 500° F. and holding the heat until the reaction is complete. The resultant drying oil product forms a suitable vehicle for wrinkle drying compositions.

In the examples given, the fatty acid-glucoside drying oil esters may be thinned to alter the viscosity and obtain the desired wrinkle texture or pattern. Various thinners and combinations may be used such as light petroleum naphtha (VMP) xylol, toluol, solvent naphtha.

As driers there may be incorporated 0.3% lead (Pb) and 0.06% cobalt (Co) based on the solids content of the composition. Lead is preferably added as lead acetate or red lead and cobalt as linoleate naphthenate, resinate or borate. Manganese borate or naphthenate may also be used especially where blown drying oils are incorporated with the fatty acid-glucoside ester oil.

An example of a cobalt drier useful for adding as a liquid is made as follows: to 60 pounds of cobalt linoleate is added 36 pounds of tung oil acids and 32 gallons of toluol. The tung oil acids are heated to 400° F. and then the linoleate introduced. The mixture is then heated back to 400° F. and held until the linoleate is dissolved. Thereafter the batch is cooled to 300° F. and the toluol added. Approximately two gallons of this drier should be added for every 55-gallon batch of the fatty acid-glucoside ester vehicles of Examples I through VII. Using cobalt naphthenate as a six percent solution, made up as in the cobalt linoleate, then only one-half gallon per 55-gallons of the ester vehicle will suffice. Preferably a combination of lead and cobalt drier is used, the lead being incorporated as lead acetate after esterification is complete and at a batch temperature of about 450° F. To produce softer dried films the lead drier content is reduced or omitted and the film-surface active driers such as cobalt increased.

For formulating pigmented coating compositions, such as enamels, paints, etc. pigment paste is incorporated with the fatty acid-glucoside ester drying oil vehicles of the foregoing examples. A pigment paste consisting of the desired color pigment grown or dispersed in a portion of the fatty acid-glucoside ester may be used for this purpose. A paste consisting, for example, of about one-third fatty acid-glucoside ester and two-thirds pigment may be used. The pigment is thoroughly dispersed into the mixture of oil, as by grinding or ball milling, to produce a homogeneous composition. The composition is then thinned by the addition of solvents such as naphtha, toluol or xylol or mixtures thereof to produce an enamel or pigmented coating of the desired viscosity for application to the surface to be coated and dried to a wrinkle finish.

As an example of a wrinkling enamel the following is given:

Example VIII

A coating of suitable viscosity for application by spraying consists of

|  | Parts by weight |
|---|---|
| Amberol (phenol formaldehyde resin) | 40 |
| Wrinkling oil (Example I) | 100 |
| Pigment paste (carbon black ground in oil Example I) | 60 |
| Metallic drier | 8 |
| Naphtha (VMP) | 15 |

In this formulation the metallic drier is prepared by heating a mixture of 15 gallons of raw tung oil, 4 pounds of lead resinate and 5 pounds of cobalt linoleate to 500° F. until a homogeneous mixture is obtained. The batch is then allowed to cool to about 350° F., and 10 gallons of light gravity petroleum naphtha and 5 gallons xylol added as a solvent thinner. The resultant liquid drier is preferably introduced in the proportion of about 4 to 6 gallons of the liquid drier to about 8 to 15 gallons of the oleoresinous liquid constituent which includes the resin, wrinkling oil, pigment and thinner mixture.

The pigment paste in this formulation is produced by grinding 6 pounds of carbon black with 40 pounds of the fatty acid-glucoside ester vehicle (Example I). Other pigments and combinations may be used depending on the color desired. A pigment mixture comprising inert fillers such as asbestine substituted for a part or in addition to the pigment may also be employed to provide a substantially non-settling paint or enamel.

The texture of the wrinkle pattern obtained may be controlled or altered by the selection of the type of synthetic resin used and the amount. The synthetic fatty acid glucoside ester oil may be combined with the oil soluble resins such as Amberol, Beckacite, or natural resin such as Congo and rosin to produce an oleo-resinous wrinkle drying composition.

The mixture of synthetic resin and wrinkling oil ester of this invention may be combined with the addition of drying oils such as linseed, tung, oiticica to thereby produce a composition which will have a wrinkle texture pattern desired. The ratio of resin to oil preferably comprises from about 10–50 parts resin for each 100 parts of wrinkling oil. As referred to heretofore, the wrinkling oils most suitable are the oils which include conjugated double bonds in their chemical structures. Such oils as tung oil, oiticica oil and modified oils, for example, dehydrated castor oil may be used, as well as linseed oil and alkali isomerized oils prepared from normally non-drying oils such as peanut oil and cotton seed oil, or oils of the fatty acid oil type wherein the isolated double bonds are conjugated to form highly unsaturated oils. The oils may be used in blown or unblown state, but in each case a sufficient amount of conjugated drying oil is incorporated to produce the wrinkle drying characteristics.

The wrinkle drying coating composition of this invention may be applied to surfaces such as metal, paper, fabric, and similar flexible materials and dried to a wrinkle finish. The composition may be applied by spraying, spreading, rolling or brushing and the resultant film air dried and the wrinkle pattern developed by baking or forced air drying the film at 150° F.–250° F. for a period of about one-half to one hour. Somewhat higher or lower drying temperatures may be employed depending on the particular formulations used and combination of constituents employed in the composition.

It will be understood that while there has been given certain specific examples of the composition and the manner of practicing the invention, it is not intended to have the invention limited thereby to the specific details and the materials, proportions and conditions herein specified, inasmuch as the invention may be modified and practiced by those skilled in the art without departing from the spirit and scope of the disclosure and the limits of the appended claims.

What is claimed is:

1. As a new composition of matter, a wrinkle drying coating composition consisting of fatty acid esters of methyl-alpha-D-glucoside combined with rosin and tung oil fatty acids.

2. The method of making a wrinkle vehicle base which consists in heat reacting rosin, tung oil fatty acids with methyl-alpha-D-glucoside to produce a wrinkle drying oil porduct.

References Cited in the file of this patent

UNITED STATES PATENTS

| 2,025,984 | Harris | Dec. 31, 1935 |
| 2,077,371 | Rheineck et al. | Apr. 13, 1937 |
| 2,110,072 | Alvarado | Mar. 1, 1938 |
| 2,373,177 | Drummond et al. | Apr. 10, 1945 |
| 2,407,003 | Griffin | Sept. 3, 1946 |
| 2,506,695 | Wicks | May 9, 1950 |
| 2,545,446 | Clark | Mar. 20, 1951 |
| 2,554,152 | Osborne et al. | May 22, 1951 |